(12) United States Patent
Meitinger et al.

(10) Patent No.: US 8,573,617 B2
(45) Date of Patent: Nov. 5, 2013

(54) WHEEL SUSPENSION FOR MOTOR VEHICLES

(75) Inventors: Karl-Heinz Meitinger, München (DE); Armin Ohletz, Kösching (DE); Walter Schmidt, Rennertshofen (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/504,852

(22) PCT Filed: Oct. 6, 2010

(86) PCT No.: PCT/EP2010/006084
§ 371 (c)(1),
(2), (4) Date: Jun. 27, 2012

(87) PCT Pub. No.: WO2011/050895
PCT Pub. Date: May 5, 2011

(65) Prior Publication Data
US 2012/0261893 A1 Oct. 18, 2012

(30) Foreign Application Priority Data
Oct. 30, 2009 (DE) .......................... 10 2009 051 469

(51) Int. Cl.
*B60G 11/18* (2006.01)
(52) U.S. Cl.
USPC ............................... 280/124.13; 280/86.757
(58) Field of Classification Search
USPC ....................... 280/124.13, 124.134, 124.135, 280/124.137, 124.149, 124.152, 124.166, 280/86.75, 86.751, 86.757
See application file for complete search history.

(56) References Cited

U.S. PATENT DOCUMENTS

| 2,631,681 | A | | 3/1953 | Utz et al. |
| 4,641,856 | A | * | 2/1987 | Reichenbach ............. 280/5.511 |
| 5,005,859 | A | | 4/1991 | Satoh et al. |
| 5,074,581 | A | | 12/1991 | Matsuoka |
| 5,716,042 | A | * | 2/1998 | Derviller ....................... 267/274 |
| 5,839,742 | A | | 11/1998 | Holt |
| 6,099,006 | A | | 8/2000 | Sugiyama et al. |
| 6,152,466 | A | | 11/2000 | Op Den Camp et al. |
| 8,006,989 | B2 | * | 8/2011 | Preukschat et al. .... 280/124.167 |
| 2005/0180817 | A1 | | 8/2005 | Daily et al. |
| 2007/0187917 | A1 | * | 8/2007 | Hasegawa et al. ......... 280/93.51 |

FOREIGN PATENT DOCUMENTS

| DE | 77 08 025 U1 | 8/1977 |
| DE | 39 37 986 A1 | 5/1991 |
| DE | 20 2005 042 821 A | 3/2007 |
| DE | 10 2006 061 984 B3 | 2/2008 |
| EP | 0 301 782 A2 | 2/1989 |
| EP | 0378 028 A1 | 7/1990 |
| EP | 1 354 731 A1 | 10/2003 |

(Continued)

*Primary Examiner* — Joseph Rocca
*Assistant Examiner* — Robert A Coker
(74) *Attorney, Agent, or Firm* — Henry M. Feiereisen LLC

(57) ABSTRACT

A wheel suspension for motor vehicles includes at least one upper control arm, in particular an upper transverse control arm, and at least one lower control arm, in particular a lower transverse control arm, which are hinged on the body of the motor vehicle suspension on the one hand, and on the other hand are connected to a wheel carrier, thus forming a preferred, substantially vertical steering axle. At least one suspension spring and at least one shock absorber are provided. The at least one suspension spring and/or the at least one shock absorber are designed to be rotatable.

23 Claims, 3 Drawing Sheets

(56) References Cited

FOREIGN PATENT DOCUMENTS

| | | |
|---|---|---|
| EP | 1 380 768 A2 | 1/2004 |
| EP | 1 935 677 A1 | 6/2008 |
| EP | 1 935 679 A1 | 6/2008 |
| GB | 756 026 | 3/1953 |
| GB | 2 270 508 A | 3/1994 |
| WO | 88/07454 | 10/1988 |
| WO | 2004/018241 A2 | 3/2004 |

* cited by examiner

WHEEL SUSPENSION FOR MOTOR VEHICLES

CROSS-REFERENCES TO RELATED APPLICATIONS

This application is the U.S. National Stage of International Application No. PCT/EP2010/006084, filed Oct. 6, 2010, which designated the United States and has been published as International Publication No. WO 2011/050895, and which claims the priority of German Patent Application, Serial No. 10 2009 051 469.4, filed Oct. 30, 2009, pursuant to 35 U.S.C. 119(a)-(d).

BACKGROUND OF THE INVENTION

The invention relates to a wheel suspension for motor vehicles.

Wheel suspensions of this type are known in many manufactured structures, wherein front wheel suspensions and rear wheels suspensions are typically designed differently and articulated on the body or on a suitably adapted auxiliary frame. In addition to elastokinematic measures for improving, in particular, the driving-dynamic requirements, mechatronic components are increasingly used which allow the level of the vehicle to be adjusted, which counteract tilt and roll, which correct camber and toe values depending on the driving-dynamic parameters, etc.

It is an object of the invention to propose a wheel suspension which can be used in modular construction for front and rear wheel axles, which enables low centers of gravity of optionally provided mechatronic components, and which can be designed for different driving-dynamic requirements by using substantially identical parts.

SUMMARY OF THE INVENTION

According an aspect of the present invention, a wheel suspension for motor vehicles includes at least one upper control arm, in particular at least one upper transverse control arm, and at least one lower control arm, in particular at least one lower transverse control arm, which is, on one hand, articulated on the body of the motor vehicle and, on the other hand, is connected with a wheel carrier by forming a substantially vertical steering axis, wherein at least one bearing spring and at least one shock absorber are provided. According to the invention, the at least one bearing spring and/or the at least one shock absorber are constructed for rotation. With this spring-damper concept, the center of gravity can be lowered further, ensuring a weight-optimized connection to springs and dampers. The relatively large forces and torques from suspension and shock absorbers are then introduced directly into the stiff bottom area of the chassis of the motor vehicle from the wheel suspension via, for example, the lower transverse control arm, where they can be securely supported. Installation space is also gained by arranging the spring and damper with a low center of gravity, which can be used, for example, for a greater unobstructed loading width in the rear section of a motor vehicle. These aforementioned advantages are greatest when both the at least one bearing spring and the at least one shock absorber are constructed for rotation.

According to a particularly preferred actual embodiment, the bearing spring is formed by at least one torsion rod and/or the shock absorber is formed by a rotation damper. With a torsion rod or rotation damper of this type, the aforedescribed advantages can be particularly easily and reliably realized.

Advantageously, at least the rotation damper is arranged coaxially with the body-side pivot axis of the lower control arm.

In an advantageous embodiment of the invention, the body-side pivot axis of the lower transverse control arm can be oriented substantially in the longitudinal direction of the vehicle. Alternatively, and more particularly in addition, the at least one torsion rod extends coaxially with respect to the pivot axis. In this way, the torsion rod can be directly connected to the lower transverse control arm without requiring coupling levers, etc.

in a simple structure, the rotation damper may also simultaneously form a bearing location of the lower control arm and may be mounted on the body. Moreover, the torsion rod may be drivingly coupled with the lower control arm by passing through the rotation damper.

For adjustment of a level and/or for compensating pitch and roll and for optional additional driving-dynamic interventions, it is also proposed that at least one additional torsion rod engages on the lower control arm, wherein the torsion rod has a spring pretension that can be adjusted with an electric motor-adjustable rotation actuator, and which can be superimposed on the bearing spring for adjusting the overall spring rate.

The axial length of the additional torsion rod may be decreased by forming the additional torsion rod from two telescoping torsion springs which are arranged inside one another and cooperate in series, which are drivingly connected with one another and, on one hand, with the rotation actuator and, on the other hand, with the lower control arm. The rotation actuator may here also simultaneously form a body-side bearing location of the lower control arm or may be installed in addition.

An advantageous structure which can be easily installed can be obtained by arranging, as viewed in a top view, the rotation damper and the first torsion rod on one side of the lower control arm and the rotation actuator and the additional torsion rod on the second side of the control arm.

Preferably, the first and/or the second torsion rod may be made from titanium. The springs may be made shorter and lighter due to the higher strength and the lower rigidity of titanium compared to steel.

The upper control arm of the wheel suspension may also be articulated on the body of the motor vehicle via an additional electric motor actuator and may be adjustable for adjusting the camber and/or toe. This provides an additional advantageous possibility for adapting the wheel suspension to driving-dynamic requirements. For example, the camber may be adjusted for improved support of lateral forces when driving through turns.

For attaining a structurally advantageous installation assembly, the actuator mounted on the body of the motor vehicle may have or may directly form the two bearing locations of the upper transverse control arm that define a pivot axis.

The length of a tracking control arm of the wheel suspension may preferably be adjustable with a control arm actuator, so as to create mutually decoupled left-side or right-side wheel suspensions, which can be installed independently, wherein the front wheels and optionally also the rear wheels of the motor vehicle can be steered together or for correcting tracking with a steel-by-wire system.

Advantageously, the two transverse control arms and the rotation damper, and optionally the rotation actuator, the actuator on the upper control arm and the control arm actuator for the tracking control arm, may be mounted on a preferably single-sided and/or one-piece modular frame. The modular frames, which are claimed in general and independently, may preferably be identical parts which can be mounted on the front of the motor vehicle as well as on the rear and which may be equipped as complete pre-installation assemblies with defined, in particular with all, components of the wheel suspension. The modular frames have preferably a closed ring-shaped outer frame part in which transverse and/or longitudinal braces forming defined openings extend. Components may pass through the openings. The components, for example the control arms and/or actuators, may be connected on the transverse and/or longitudinal braces. The modular frame extends in the installed state preferably along a vertical plane spanned by the longitudinal vehicle axis and the vertical vehicle axis.

The modular frame may furthermore be connected with the body of the motor vehicle via passive or active, preferably rubber-elastic decoupling elements, in particular rubber-metal bearings, wherein the decoupling elements are preferably designed to be more easily yieldable in the longitudinal direction than in the transverse direction. This produces a high lateral stiffness with precise steerability of the wheel guidance, with simultaneous improved longitudinal yieldability when driving over uneven roads. By mechanically decoupling the wheels suspensions from each other, unintentional steering movement of the wheels are prevented.

In particular in combination therewith, the body-side and the wheel carrier-side bearing locations of at least a part of the control arm, preferably the upper and the lower control arm, which are more particularly formed by transverse control arms, and of the tracking control arm, are substantially formed by inelastic articulated joints in order to optimize the force transmission paths from the actuators to the wheels. Because the elastic properties between the actuators and the wheels are reduced and substantially limited to linear elastic properties, the wheel position can be more accurately computed and the control of the wheel positions can be optimized.

A particular advantageous and energy-efficient design of the wheels suspensions can be attained by enabling switching of the rotation damper coupled with the lower control arm and/or the rotation actuator to generator mode for recuperation operation. In addition to the resulting energy recovery, the rotation actuator can also operate as an additional rotation damper and assist with damping of vibrations, in particular in a low-frequency range.

Lastly, according to another separate aspect of the invention, when the wheels of the motor vehicle are driven via cardan shafts, the disk brakes of the service brake may be arranged in the flux of force from the cardan shafts and outside the wheel suspension. This approach can further lower the center of gravity of the suspension and damping systems of the wheel suspension, because wheels with a smaller diameter can be used due to the elimination of the relatively large disk brakes in the region of the wheel rims.

BRIEF DESCRIPTION OF THE DRAWING

An exemplary embodiment of the invention will now be described in more detail. The schematic drawing shows in.

DETAILED DESCRIPTION OF PREFERRED EMBODIMENTS

Figure 1:
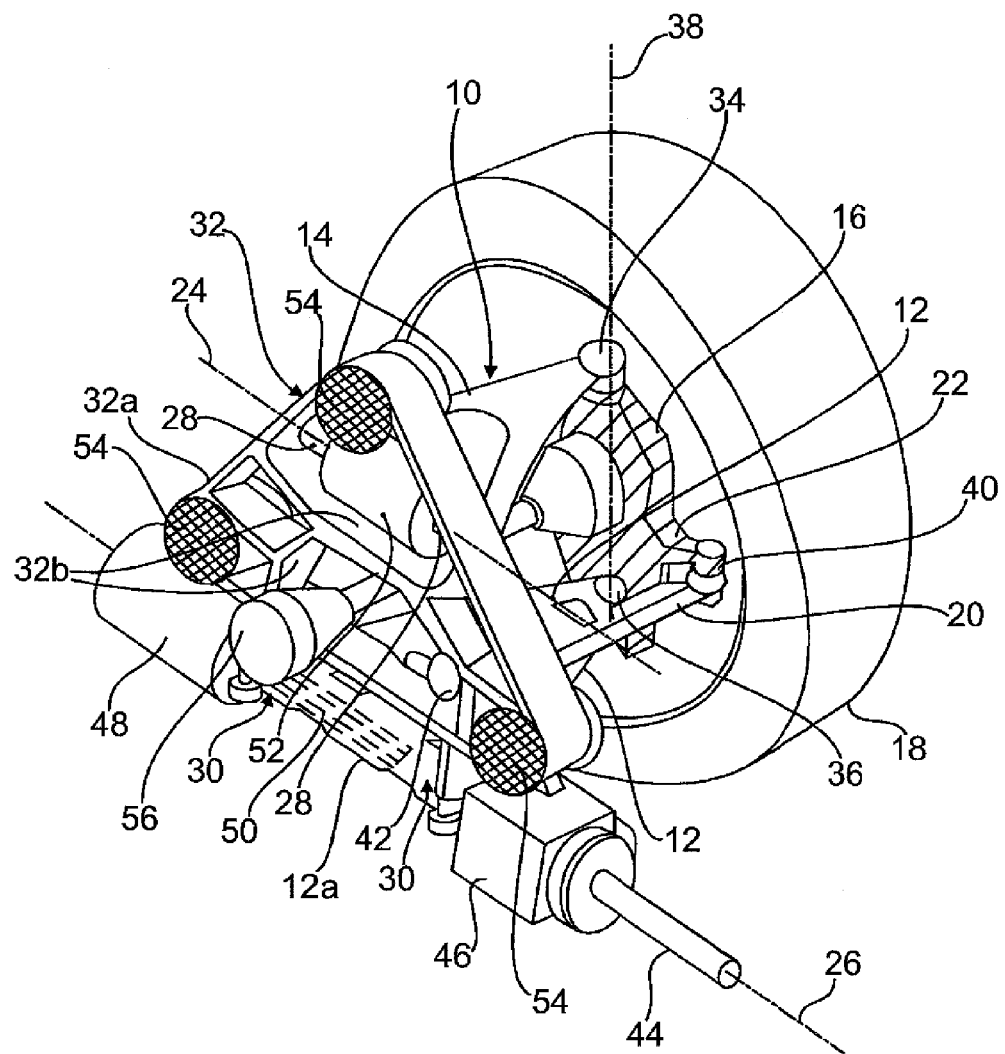
FIG. 1 in a three-dimensional diagram, a wheel suspension for motor vehicles with an upper and a lower transverse control arm, which are articulated on a modular frame, and with a rotation damper, a rotation actuator, a torsion rod as a bearing spring and with a control arm actuator.
Figure 2:
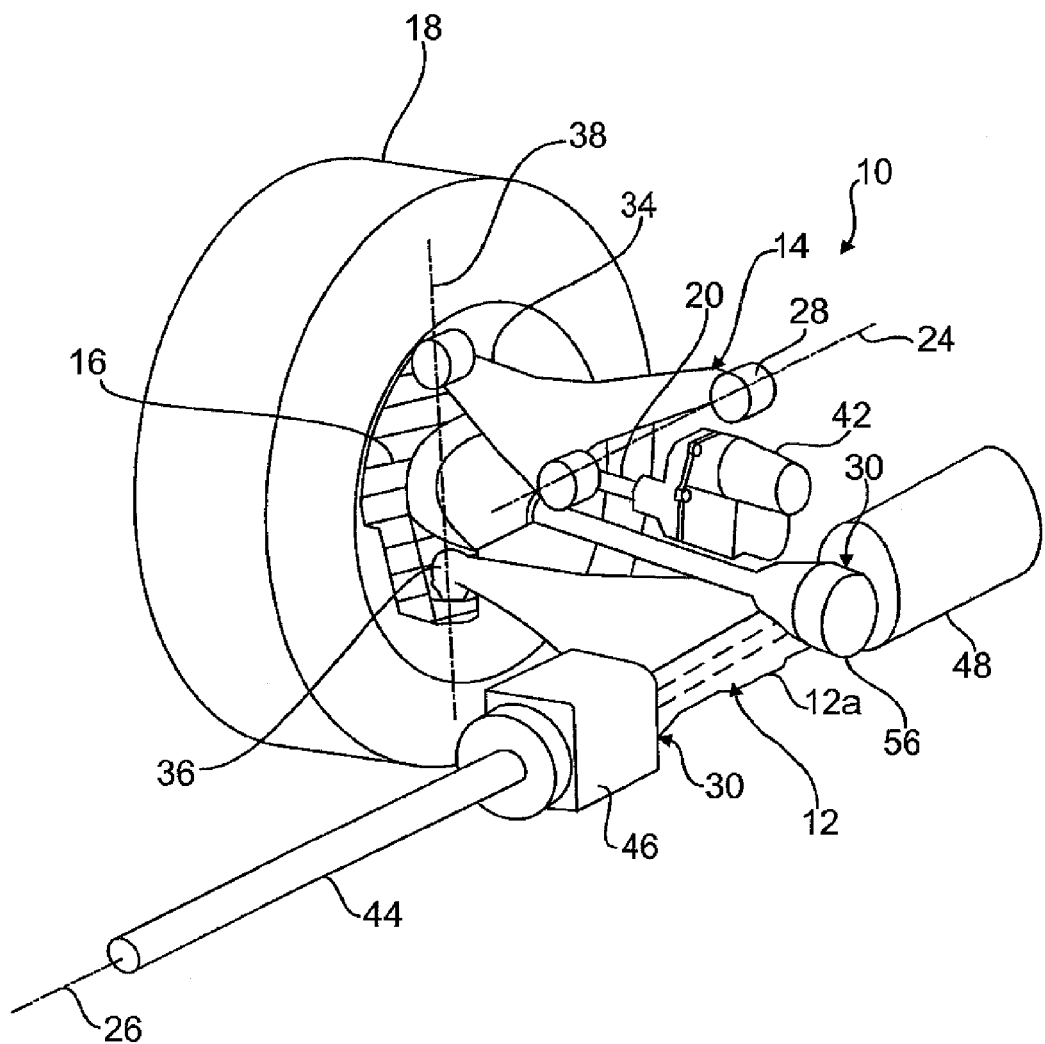
FIG. 2 the wheel suspension according to FIG. 1 without a modular frame.

FIGS. 1 and 2 show into a different views a wheel suspension 10 for motor vehicles, which can be used on the front axle and on the rear axle.

The wheel suspension 10 is substantially constructed from a lower transverse control arm 12, an upper transverse control arm 14, a wheel carrier 16 for a rotatably supported wheel 18, and a tracking control arm 20 which is articulated on a control arm 22 of the wheel carrier 16.

The two transverse control arms 12, 14 are each articulated on a modular frame 32 about a corresponding horizontal pivot axis 24, 26 oriented approximately parallel to the longitudinal axis of the vehicle by way of two bearing locations 28, 30. The transverse control arms 12, 14 are connected on the side of the wheel carriers with the wheel carrier 16 by ball joints 34, 36, forming a vertical steering axis 38.

The tracking control arm 20 (also referred to as tie rod) is articulated via an additional ball joints 40 on the control arm 22 in a space outside this steering axis 38 and is also connected in an articulated manner with the control arm actuator 42 (see in particular FIG. 2), which is in turn screwed together with the modular frame 32.

The length of the tracking control arm 20 can be adjusted with the control arm actuator 42 with an electric motor for controlling a steering movement of the wheel 18 or for correcting toe.

The lower transverse control arm 12 is directly drivingly connected with a torsion bar 44 (only partially visible) arranged coaxially with the pivot axis 26 of the control arm 12. The torsion bar 44 operates as bearing spring and is (not shown) fixedly connected with the body of the motor vehicle. The connections may be implemented, for example, as notch-plug toothing.

The torsion bar 44 passes through the rotation damper 46 which is also arranged coaxially with the pivot axis 26 and directly adjacent to the transverse control arm 12 and which operates as a shock absorber. The housing of the rotation damper 46 is screwed together with the modular frame 32 and the rotor parts (not visible) of the rotation damper 46 are drivingly fixedly connected with the transverse control arm 12.

A rotation actuator 48 is provided on the opposite side of the transverse control arm 12 coaxially with its pivot axis 26, wherein the housing of the rotation actuator 48 is in turn screwed together with the modular frame 32 and the rotor parts (not visible) are drivingly connected via a second torsion bar 50—shown only by dashed lines—with the lower control arm 12.

The torsion bar 50 is here arranged inside a tubular section 12a of the transverse control arm 12 and is constructed of two telescoping torsion springs made of, for example, titanium, which are fixedly connected with each other inside the tubular section 12a, whereas their free ends are drivingly connected with the rotation actuator 48 and the transverse control arm 12, respectively.

The pretension of the second torsion bar 50 can be varied by the rotation actuator 48 for changing the total spring rate of the first torsion bar employed as a bearing spring, for example for level adjustment of the chassis of the motor vehicle, for compensation of roll and pitch, etc.

An additional electromotor-operated actuator 52 is mounted on the modular frame 32 in the region of the pivot axis 24 of the upper transverse control arm 14 for adjusting the steering axis 38 of the wheel 18 for controlling camber and/or caster, etc. The actuator 52 forms at the same time the bearing locations 28 of the upper transverse control arm 14, i.e. the bearing locations 28 of the upper transverse control arm 14 are supported there. The bearing locations 28 may be adjusted relative to the modular frame 32 in defined spatial direction, preferably in at least one transverse direction, by suitable control of the actuator 52.

The modular frame 32 is screwed to the body of the motor vehicle by three rubber-metal bearings (schematically illustrated by cross-hatching) inserted in integrally formed bearing bushes 54. The rubber-metal bearing are hereby designed to be harder in the transverse direction of the vehicle than in the longitudinal direction of the vehicle, so as to ensure a comfortable longitudinal spring action of the wheel suspension 10.

In addition, the bearing locations 28, 34 of the upper transverse control arm 14, the bearing locations 30, 36 of the lower transverse control arm 12 and the articulated joint 36 on the control arm 20 with the articulated joint on the control rod actuator 42, which is not shown in detail, are constructed substantially inelastic (i.e., not intentionally elastic) so as to enable the actuators 42, 46, 48, 52 to precisely control wheel guidance and wheel positions. The bearing locations 30 of the transverse control arm 12 may also be arranged directly in the actuators 46, 48 instead of on the modular frame 32.

The wheel 18 is connected with a Cardan shaft 56 which is drivingly connected with the drive assembly of the motor vehicle, wherein the unillustrated disk brake of the wheel 18 is positioned in the flux of force before the Cardan shaft 56, i.e. directly on the respective output of the drive assembly.

The wheel suspension 10 illustrated in FIG. 1 with the modular frame 32 forms a pre-installation unit which can be used in an all-wheel motor vehicle with four-wheel steering on the front axle (front wheel suspensions 10) and on the rear axle (rear wheel suspensions 10). The left-hand and right-hand embodiments may be constructed with mirror symmetry; however, the components may be identical due to the symmetric construction of the components.

The rotation damper 46 is preferably constructed as a generator, so that the damping energy to be generated in recuperation mode can be returned as electric energy to the onboard network of the motor vehicle. However, the rotation damper 48 may, in combination or solely, also be constructed as a hydraulic damper, optionally with an electro-rheological damping fluid, for adjusting the damping effect.

The rotation actuator 48 may also be switched as a generator, in addition to the electromotor-controlled change of the pretension of the second torsion bar 50, to optionally provide additional damping in recuperation mode and/or to store recovered energy.

Figure 3:
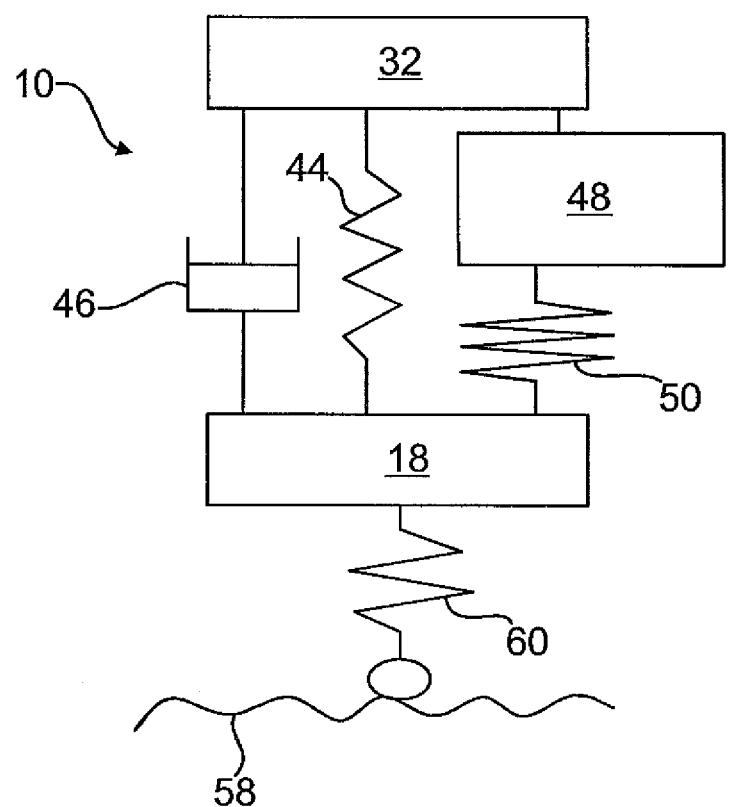
FIG. 3 an equivalent functional diagram of the suspension and damping system of the wheel suspension according to FIGS. 1 and 2.

FIG. 3 shows the schematic diagram of the suspension and damping system of the wheel suspension 10 illustrated in FIGS. 1 and 2. Functionally identical parts have identical reference symbols.

As can be seen, the torsion bar 44 as a bearing spring and the second torsion rod 50 are arranged in parallel between the body (modular frame 32) and the wheel 18, wherein the pretension may be superimposed on the second torsion bar 50 with the rotation actuator 48 for level adjustment and for tilt and roll compensation of the motor vehicle, commensurate with the first torsion bar 44. The springs 44, 50 are shown as coil compression springs for sake of simplicity.

The likewise parallel-connected rotation damper 46 (again shown in a simplified diagram) operates in a conventional manner for damping the body oscillations excited by the unevenness of the road surface 58 and by the elasticity factor 60 of the tire of the wheel 18. As described above, the rotation actuator 48 may optionally also produce a defined damping effect.

What is claimed is:

1. A wheel suspension for a motor vehicle, comprising:
   at least one upper control arm and at least one lower control arm, wherein the at least one upper control arm and the at least one lower control arm are articulated on a body of the motor vehicle and connected to a wheel carrier to form a substantially vertical steering axis, and
   at least one bearing spring formed by at least one first torsion bar and at least one shock absorber, with at least one of the at least one bearing spring and the at least one shock absorber constructed for rotation, and
   wherein the at least one first torsion bar is drivingly coupled with the lower control arm and passes through a rotation damper of the at least one shock absorber.

2. The wheel suspension of claim 1, wherein the at least one upper control arm is an upper transverse control arm.

3. The wheel suspension of claim 1, wherein the at least one lower control arm is a lower transverse control arm.

4. The wheel suspension of claim 1, wherein the at least one bearing spring and the at least one shock absorber operate on the lower control arm and are supported on the body.

5. The wheel suspension of claim 1, wherein the at least one shock absorber is formed by a rotation damper.

6. The wheel suspension of claim 5, wherein at least the rotation damper is arranged coaxially with respect to a body-side first pivot axis of the lower control arm.

7. The wheel suspension of claim 6, wherein the body-side first pivot axis of the lower control arm is oriented substantially in a longitudinal direction of the motor vehicle.

8. The wheel suspension of claim 5, wherein the rotation damper simultaneously forms a bearing location of the lower control arm and is mounted on the body.

9. The wheel suspension of claim 1, wherein the at least one first torsion bar extends coaxially with respect to a body-side first pivot axis of the lower control arm.

10. The wheel suspension of claim 1, wherein wheels of the motor vehicle are driven via cardan shafts, and wherein disk brakes of a service brake are arranged in a flux of force before the cardan shafts and exterior of the wheel suspension.

11. A wheel suspension for a motor vehicle, comprising:
    at least one upper control arm and at least one lower control arm, wherein the at least one upper control arm and the at least one lower control arm are articulated on a body of the motor vehicle and connected to a wheel carrier to form a substantially vertical steering axis,
    at least one bearing spring formed by at least one first torsion bar and at least one shock absorber, with at least one of the at least one bearing spring and the at least one shock absorber constructed for rotation, and
    at least one additional torsion bar engaging on the lower control arm, wherein a spring pretension of the at least one additional torsion bar is adjustable with an electric-motor-driven rotation actuator.

12. The wheel suspension of claim 11, wherein the at least one additional torsion bar is formed by two telescoping torsion springs arranged inside one another and cooperating serially, with the torsion springs being drivingly connected with one another and also with the rotation actuator and with the lower control arm.

13. The wheel suspension of claim 11, wherein the rotation actuator simultaneously forms a body-side bearing location of the lower control arm.

14. The wheel suspension of claim 11, wherein the shock absorber is formed by a rotation damper and wherein, when viewed in a top view, the rotation damper and the at least one first torsion bar are arranged on a first side of the lower control arm in reference to a longitudinal center plane, and the rotation actuator and the at least one additional torsion bar are arranged on an opposite second side of the lower control arm in reference to the longitudinal center plane and spaced apart from the rotation damper and the at least one first torsion bar.

15. The wheel suspension of claim 11, wherein at least one spring element selected from the at least one bearing spring, the at least one first torsion bar and the at least one second torsion bar is made from titanium.

16. A wheel suspension for a motor vehicle, comprising:
at least one upper control arm and at least one lower control arm, wherein the at least one upper control arm and the at least one lower control arm are articulated on a body of the motor vehicle and connected to a wheel carrier to form a substantially vertical steering axis, and
at least one bearing spring and at least one shock absorber, wherein the at least one bearing spring or the at least one shock absorber, or both, are constructed for rotation,
wherein the upper control arm is articulated on the body of the motor vehicle by an electric-motor-driven actuator for adjusting at least one of camber and caster.

17. The wheel suspension of claim 16, wherein the electric-motor-driven actuator forms at least two bearing locations of the at least one upper control arm which define a second pivot axis.

18. A wheel suspension for a motor vehicle, comprising:
at least one upper control arm and at least one lower control arm, wherein the at least one upper control arm and the at least one lower control arm are articulated on a body of the motor vehicle and connected to a wheel carrier to form a substantially vertical steering axis,
at least one bearing spring and at least one shock absorber, wherein the at least one bearing spring or the at least one shock absorber, or both, are constructed for rotation,
a tracking control arm operating on a control arm of the wheel carrier, said tracking control arm being articulated on the body, either non-adjustable or adjustable via a steering device, and a control arm actuator for adjusting a length of the tracking control arm.

19. The wheel suspension of claim 18, wherein bearing locations on a side of the body and on a side of the wheel carrier of the at least one upper control arm, the at least one lower control arm and the tracking control arm are formed by substantially inelastic joints.

20. A wheel suspension for a motor vehicle, comprising:
at least one upper control arm and at least one lower control arm, wherein the at least one upper control arm and the at least one lower control arm are articulated on a body of the motor vehicle and connected to a wheel carrier to form a substantially vertical steering axis, and
at least one bearing spring and at least one shock absorber, wherein the at least one bearing spring or the at least one shock absorber, or both, are constructed for rotation,
a single-sided or one-piece modular frame connected with the body of the motor vehicle via passive or active decoupling elements and configured for mounting at least one element selected from the at least one upper control arm, the at least one lower control arm, at least one tracking control arm, the at least one shock absorber, a rotation actuator for a torsion bar, an actuator for the at least one upper control arm and a control arm actuator for the at least one tracking control arm.

21. The wheel suspension of claim 20, wherein the decoupling elements are decoupling elements selected from rubber-elastic decoupling elements and rubber-metal bearings.

22. The wheel suspension of claim 21, wherein the decoupling elements are constructed to be more yieldable in a longitudinal direction of the motor vehicle than in a transverse direction.

23. The wheel suspension of claim 21, wherein the at least one shock absorber or the rotation actuator, or both, are configured to be switched to generator mode in recuperation operation.

* * * * *